United States Patent [19]

Rombaut

[11] Patent Number: 4,639,913
[45] Date of Patent: Jan. 27, 1987

[54] METHOD AND EQUIPMENT FOR ELECTRONICALLY TRANSMITTING INFORMATIONS

[76] Inventor: Willy Rombaut, Leopoldstraat 55, 9400 Ninove-Okegem, Belgium

[21] Appl. No.: 683,672

[22] Filed: Dec. 19, 1984

[30] Foreign Application Priority Data

Dec. 19, 1983 [BE] Belgium .................. 898499

[51] Int. Cl.⁴ .............................. H04J 3/02
[52] U.S. Cl. ........................ 370/90; 370/96; 340/870.13
[58] Field of Search ............. 370/90, 96, 89; 340/870.14, 870.13, 825.05

[56] References Cited
U.S. PATENT DOCUMENTS

| | | | |
|---|---|---|---|
| 3,633,169 | 1/1972 | Bickford | 370/90 |
| 3,752,932 | 8/1973 | Frisone | 370/90 |
| 4,360,912 | 11/1982 | Metz et al. | 370/96 |
| 4,386,426 | 5/1983 | Pugh | 370/90 |

*Primary Examiner*—Douglas W. Olms
*Attorney, Agent, or Firm*—Cushman, Darby & Cushman

[57] ABSTRACT

There are described a method and an equipment for electronically transmitting informations, whereby by means of a pulse generator, a clock pulse series is generated, said pulses are fed to a closed or ring line, in a point on said line the frontmost pulse is picked up or separated and the following pulses are left to move on the path thereof on said line, the picked-up pulse is treated to convey thereto the information to be transmitted, and the thus-treated pulse is fed to an answer line, and said picking-up and treatment operations on the various frontmost pulses are performed as many times as required for the transmission of all the informations intended to be transmitted.

10 Claims, 2 Drawing Figures

METHOD AND EQUIPMENT FOR ELECTRONICALLY TRANSMITTING INFORMATIONS

This invention relates to a method for electronically transmitting a plurality of information to various receiving points, as well as relating to an equipment for working such a method.

It does often occur that a plurality of informations, such as control commands, measuring results, or monitoring informations have to be transmitted to one or a plurality of receiving points.

When it is not desired to provide a discrete transmission line for each said data, it is required to make use of some means for combining the data on a common transmission medium. Such a means is for example formed by the so-called "multiplex" system with time division, which comprises transmitting interwoven pulses which pertain to the various informations to be transmitted.

Such a system is however difficult to use and is valid but for large equipments, such as for example telephone systems.

Consequently when it is to the contrary a matter of small equipments, such as electric lighting or current distribution equipments, whether or not combined with a safety system, the "multiplex" system is much too intricate.

The invention has for an object to provide a system which allows by means of a relatively simple and inexpensive means which are easy to arrange, transmitting a plurality of informations, such as commands and measuring and detecting results from one or a plurality of points to one or a plurality of receiving elements where the informations may be treated and used for various purposes.

For this purpose, the method for electronically transmitting informations according to the invention comprises generating with a pulse generator, a clock pulse series, transmitting said pulses on a closed common line, picking up in a point on said common line, the frontmost pulses or pulse groups and letting the following pulses move on their way along said common line, acting on the picked-up pulse or pulse group to convey thereto the information to be transmitted and feeding the thus-treated pulse or pulse group to a common answer line, performing such picking-up and treating operations for the various frontmost pulse or pulse group as many times as required for transmitting all the informations intended to be transmitted, feeding the treated pulse series on the answer line to a receiving means wherein according to the clock sequence, the various treated pulses are separated for making use of the information content thereof, and the first clock pulse or pulse group after using same for transmitting informations, is used to return the pick-up means to the original position thereof and to cause the clock pulse generator to perform a new cycle.

Picking-up of the pulses is usefully performed by means of an electronic counter.

The invention further pertains to an equipment for the working of the above-defined method, which comprises a clock pulse generator, a closed common transmission line and in various points on said line, means for picking-up pulses, whereby each said means picks up by means of an electronic counter, the frontmost pulse or pulse group reaching the pertaining point, while letting the following clock pulses move along the path thereof to a following pick-up means, in such a way that each pick-up means separates another pulse or pulse group, whereby further the pulse or pulse group which reaches the output of the last pick-up means, is fed to the clock pulse generator to return said pick-up means to the original condition thereof and to cause the clock pulse generator to start a new cycle, and whereby the pulse or pulse group separated by each pick-up means is transmitted to means for treating said pulse or pulse group for conveying thereto the information to be transmitted, and whereby finally said means for treating the pulse or pulse group feeds same along a common answer line to a receiving means wherein anew each treated pulse or pulse group is separated according to the clock sequence, and each treated and separated pulse or pulse group is fed to a circuit wherein the information conveyed by said pulse or pulse group is used.

As it appears, the originality of the invention lies in the possibility to feed after each receiving element those informations which are not intended therefor, to other receiving elements, and this in a simple way by means of a single closed transmission line.

Other details and features of the invention will stand out from the following description, given by way of non limitative example and with reference to the accompanying drawings, in which.

Figure 1:
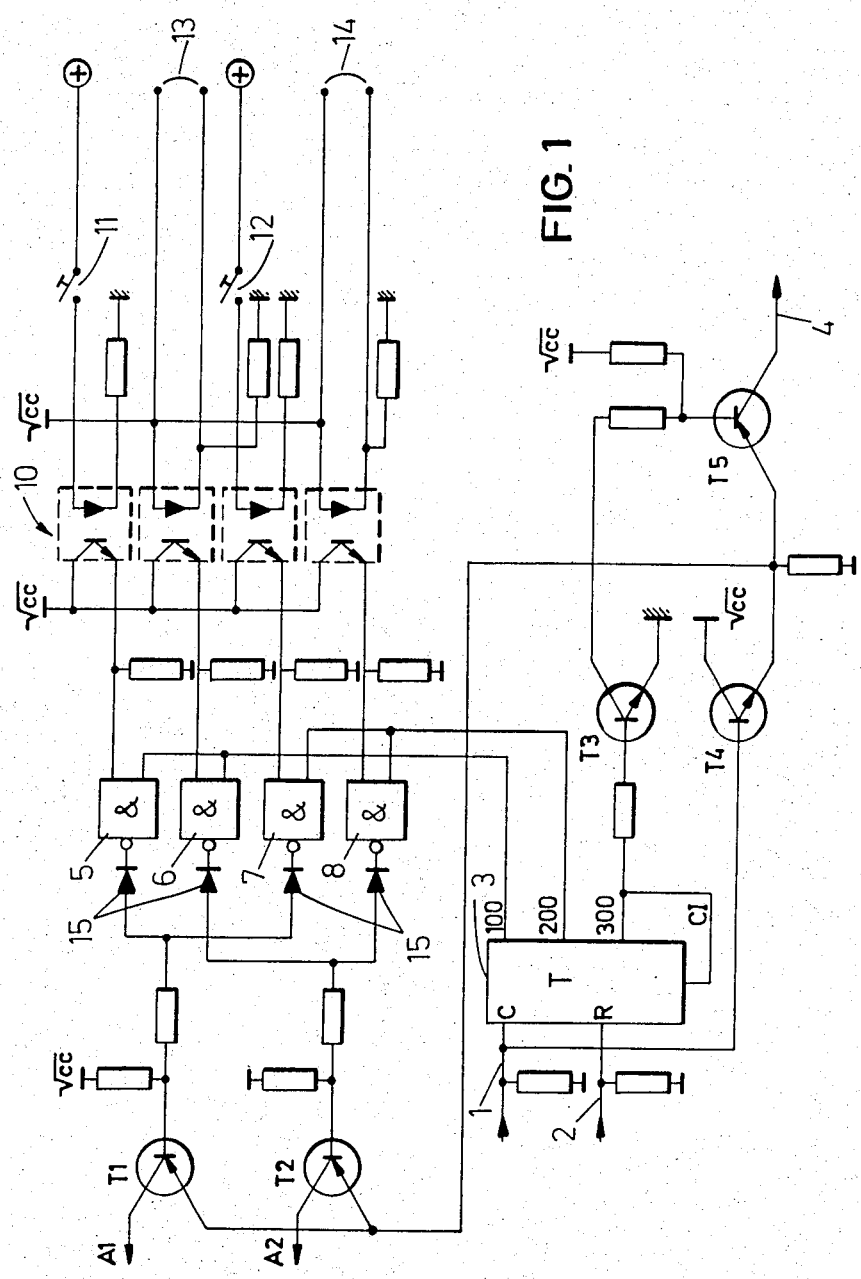
FIG. 1 shows a simplified diagram of a pulse pick-up circuit according to the invention.

The pulse pick-up or separating circuit is intended to always pull-off the frontmost pulse or pulse group from a pulse string or pulse series being transmitted over a common closed line. These pulses are generated by a clock pulse generator not shown, also called a clock multivibrator, and said pulses are coupled to the input 1 of an electronic counter 3. The first incident clock pulse brings the counter output 100 to a logic 1-level.

When thereafter the contact 11 of a push-button switch for example is closed, there appears a data block which is a function of the signal being fed, on the second output from a NAND gate 5 to the first input of which is coupled the 1-level output from counter 3 and which thus couples the data block to a transistor $T_1$ which will be caused to conduct by a clock pulse to let the data be transferred to the answer line $A_1$. The clock pulse is coupled to transistor $T_1$ by means of a buffer transistor $T_4$, from the closed or ring line to the input of counter 3.

The data which may correspond to a command, such as a command to light a lamp, the result of a measuring operation, or the closing of a safety contact, are thus transmitted on the answer line $A_1$, to a receiving element not shown, to be used or valued therein.

It will be good practice to manufacture twin pulse pick-up modules. Consequently, counter 3 has a second output 200 which is raised to logic 1-level by the second clock pulse.

A second NAND gate is also connected to said second output 200, and it is possible to cause the transmission of analogue data by means of another push-button switch 12 for example.

In the embodiment as shown, a combination with a safety system is provided and in the module is thus comprised a second answer transistor $T_2$ which acts on a second answer line $A_2$, with the same working as for the first answer line $A_1$.

The various contacts 11 to 14 are connected to the NAND gates 5 to 8 through opto-isolators 10 which insure galvanic separation of the circuits.

Diodes 15 insure a mutual decoupling of the outputs from gates 5 to 8 relative to transistors $T_1$ and $T_2$ respectively.

The third clock pulse raises the third output 300 of counter 3 to logic 1-level. Third output 300 is coupled to the input CI of the counter to block same. Output level 1 is also coupled through buffer transistor $T_3$ to a normally non-conducting transistor $T_5$ which then conducts on that moment where a clock pulse appears at the base of transistor $T_4$.

Consequently, those clock pulses which follow the pulses which are picked up in the above-described pick-up circuit, may follow the path thereof on transmission line 4 to other pick-up modules.

The counter 3 is returned to the original position thereof (that is, reset) by means of a pulse which is coupled to input 2 thereof, and a new cycle may thus start again.

This pulse for returning to the original position is generated in a way which will be further described hereinafter. It is thus possible by means of each pick-up circuit:

(1) to pick up or separate the frontmost pulse or pulse group from a pulse string which reaches said pick-up circuit, and (2) to let the following pulses from the string follow the path thereof.

Consequently, each pick-up circuit separates a well-defined pulse or pulse group from the pulse string.

The pulse or pulse group may then be used for a new transmission of an information pertaining to the pick-up circuit, for example transmitting or not transmitting a corresponding pulse on answer line $A_1$ or $A_2$ (called all-or-nothing modulation).

As the time position of the pulse is defined by the clock frequency, the answer lines $A_1$ and $A_2$ from each pick-up circuit form a common answer line which conveys the answer pulses.

There will now be described with reference to FIG. 2, the association of a plurality of pick-up modules which are combined in a lighting operating equipment together with a safety system.

The heart of the installation is formed by the pulse pick-up modules as shown in FIG. 1.

Said modules 33 to 39 are connected in a common line 31 which begins at a main module 29. Said latter module comprises a clock multivibrator which couples the pulses thereof to the common line 31, at a suitable frequency which is selected at will according to the considered application.

The pulse string reaches a first pick-up module 33 where the frontmost pulse or pulse group is picked up, while the following pulses are fed to the following module 34 where a picking-up or separation is again performed together with the transmission of the following pulses, etc. down to the last module 39.

The first pulse or pulse group which leaves said last module 39, is fed back on a line 40 to the main module 29 where said pulses are used to return the clock multivibrator and the counters of the pick-up modules to the original condition thereof, in such a way that a new cycle will start.

Receiver modules 30, which are comprised of pick-up circuits which are similar to the pick-up modules, are then connected to the main module. These pick-up circuits thus allow to separate the answer pulses which originate from the pick-up modules 33 to 39 and which come on one or two answer lines, depending on whether the pick-up modules are connected in a safety or protection circuit (ring circuit).

Each information pulse is then coupled by a line 28 to an operating relay or another user circuit 27.

The operating relays act for example on light points 21 to 26 from a lighting installation.

In a preferred embodiment, the relays are operated through an electronic switching circuit, in such a way that a second control or operating pulse is required to change anew the relay position, by means of the switching circuit.

The switch modules 30 may be connected to display components, such as light-emitting diodes (LED) to show the working condition of each pick-up circuit.

Figure 2:
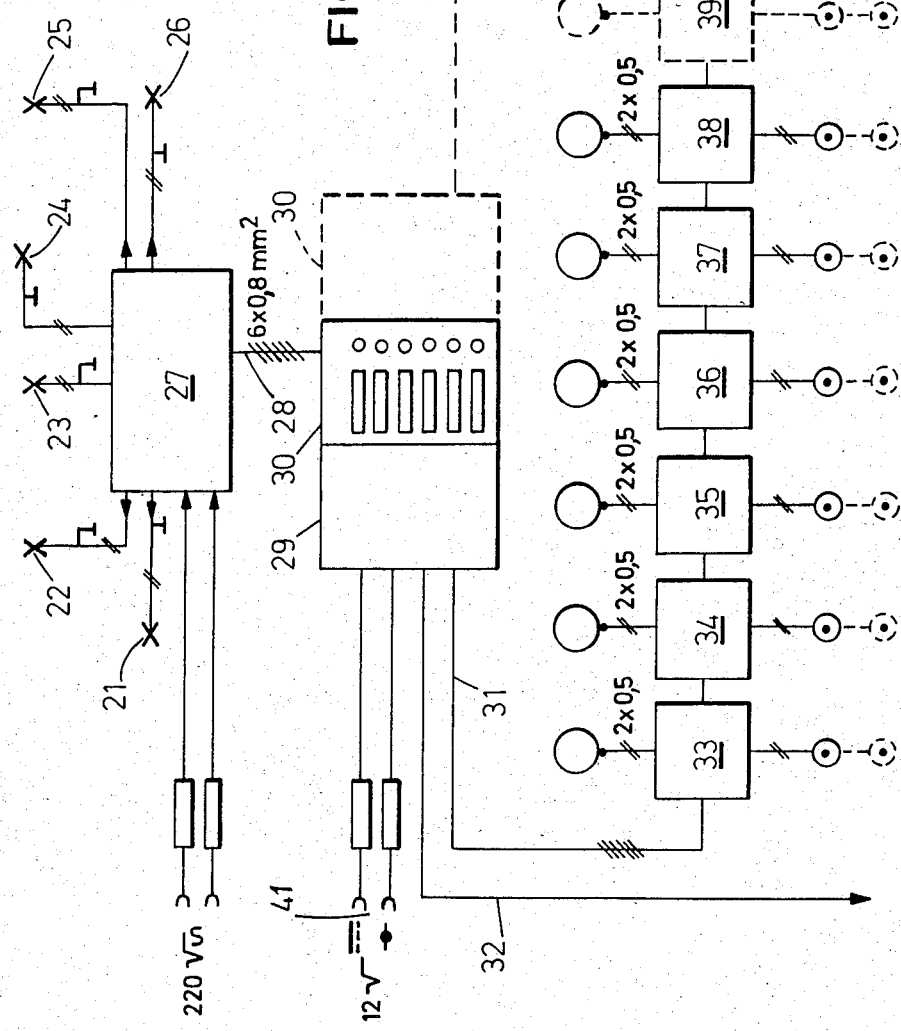
FIG. 2 shows a block diagram of a lighting operating installation which is combined with a safety equipment, wherein use is made of the method according to the invention for electronically transmitting informations.

The arrangement as shown in FIG. 2 also comprises a safety system.

All or part of the pick-up modules 33 to 39 comprise besides operating push-buttons, one or a plurality of safety contacts or sensors, the information of which is transmitted on that moment which corresponds to the clock pulse of the pick-up module connected thereto, to the transistor $T_2$ and the answer line $A_2$ of the module (see FIG. 1).

The informations from the safety or protection system on the second common answer line $A_2$ are treated in a similar way to the way the operating pulses on answer line $A_1$ are treated, and they are used for operating alarm devices not shown, which may or may not operate light points or similar from said installation.

A suitable D.C. low voltage supply is provided in 41 for the various modules and electronic circuits.

The electric current is preferably supplied on two wires which are connected to the common ring line.

Instead of the above-described all-or-nothing information system, it is clear that a modulation may also be performed according to suitable standards for the picked-up pulses, without interfering with the invention principle. In this case, it will for example be possible to transmit physical values, such as informations regarding temperature control regulation.

It is clear that the invention is in no way limited to the above embodiments and that many changes may be brought thereto without departing from the scope of the invention, as defined by the appended claims.

For instance, it would be possible to control the lighting and heating equipments separately in each room and this from a central location such as the reception desk in a hotel or hospital for example. It is further possible to call each room, without it being possible after a first call, to repeat such call.

The method and equipment according to the invention may further be applied for controlling the closing of doors and windows, for cutting in and out the heating, and for controlling continuously the lighting equipment both in private homes and in larger buildings.

I claim:

1. Method for electronically transmitting informations, comprising the steps of:
    generating a clock pulse series with a pulse generator which clock pulse series includes a plurality of clock pulses, each of which include at least one pulse;

transmitting said clock pulses on a common line said pulses being transmitted on a first end of said common line, and a second end thereof being coupled to a point near said first end, so that said common line is formed in a ring, picking up the frontmost clock pulse at a first point on said common line and letting the ones of the clock pulses that follow said front-most clock pulse move along said common line;

performing an operation on the picked-up clock pulse which conveys thereto the information to be transmitted to form a treated pulse, and feeding such treated pulse to a common answer line;

performing picking-up and treating steps for frontmost clock pulses for all information to be transmitted;

feeding the treated clock pulses on the answer line to a receiving means and separating the various treated pulses according to the clock sequence to make use of the information content thereof; and using the first clock pulse to return the pick-up means to an original condition thereof and to cause the clock pulse generator to perform a new cycle after using the same for transmitting informations.

2. Method as defined in claim 1, in which said picking-up step is performed by an electronic counter means, and includes the steps of receiving the clock pulse series at a counting input thereof; and feeding the first clock pulse to a first output thereof; whereby a directly following clock pulse which reaches a second input, is used to block the counter and cause the transmission of all those clock pulses which follow the separated clock pulse on the common ring line to one or a plurality of possible following pulse separations.

3. Method as defined in claim 1, in which the treatment of the separated pulses step includes at least one of the steps of transmitting again said pulses and not transmitting again said pulses.

4. Method as defined in claim 1, in which said treatment of the pulses step includes the step of modulating the pulses with the information to be transmitted.

5. Method as defined in claim 1, which is used for controlling a switching-, regulating-, and/or safety equipment.

6. An apparatus for transmitting informations comprising:

clock pulse generator means for generating at least one clock pulse which includes at least one pulse;

a common transmission line with a first end and a second end, both of which ends couple to points near one another;

means for picking up pulses located at various points on said transmission line, for picking up the frontmost clock pulse reaching a point at which said picking up means is located, while letting the following clock pulses move along the path thereof to another pick-up means, each pick-up means also for separating another clock pulse so that the clock pulse which reaches the output of the last pick-up means is fed to the clock pulse generator to return said pick-up means to an original condition thereof and to cause the clock pulse generator to start a new cycle, said pick-up means including an electronic counter;

treating means, coupled to each said pick up means to receive said clock pulses separated thereby, for treating said pulse and for conveying thereto the information to be transmitted, and for feeding such clock pulse along a common answer line;

receiving means, coupled to said common answer line, for separating each treated pulse according to the clock sequence; and circuit means, coupled to each treated and separated pulse, for using the information conveyed by said pulse.

7. An apparatus as defined in claim 6, wherein the receiving means is also for controlling relays by using the treated pulses after the separation thereof.

8. An apparatus as defined in claim 7, further comprising electronic switching means for producing pulses to return the rely as to the original position thereof.

9. An apparatus as defined in claim 6, further comprising means for displaying information, coupled to said receiving means.

10. An apparatus as defined in claim 6, in which the information being transmitted are at least one of commands for a switching equipment, and originating from sensors of a safety or protection equipment or physical magnitude meters of one of analogue and digital type.

* * * * *